United States Patent [19]

Hinkle et al.

[11] 3,979,561
[45] Sept. 7, 1976

[54] LEVEL-CODE ENCODED MULTIPLEXER
[75] Inventors: Francis E. Hinkle; David F. Rohde, both of Austin, Tex.
[73] Assignee: The United States of America as represented by the Secretary of the Navy, Washington, D.C.
[22] Filed: May 6, 1975
[21] Appl. No.: 574,998

[52] U.S. Cl. .............................. 179/15 A; 360/18; 360/24
[51] Int. Cl.² ......................................... H04J 7/00
[58] Field of Search ........ 179/15 A, 15 BL, 15 AZ; 325/38 A; 360/22, 24, 32, 18

[56] References Cited
UNITED STATES PATENTS 2,041,245  5/1936  Haffcke .......................... 179/15 AZ
3,803,362  4/1974  Frannea ........................... 179/15 A
3,855,419  12/1974  Hurford ........................... 179/15 A Primary Examiner—David L. Stewart
Attorney, Agent, or Firm—R. Sciascia; R. Beers; S. Sheinbein

[57] ABSTRACT

Apparatus for multiplexing a large number of digital signals onto a few analog channels using a level code encoded multiplexer. Each digital signal to be multiplexed is assigned a unique reference level to represent a logical "one", with all digital inputs assigned the same zero ground as a base line for a logical "zero".

2 Claims, 2 Drawing Figures

LEVEL-CODE ENCODED MULTIPLEXER

BACKGROUND OF THE INVENTION

The present invention relates to analog recorders and more specifically to the recording of digital information on analog recorders.

Many analog recorders employ multiplexing schemes to record a plurality of signals onto their various channels. More multiplexing schemes employ a technique where each input signal is given its own sub-channel on each input to the analog recorder. A unique base line is assigned to each input by the addition of a unique voltage. Since each signal is given its own base line, adjustments are included to position the signals across the recording surface. Gain adjustments are also included in order to adjust the maximum relative amplitude of each sub-channel.

All of the aforementioned adjustments are not necessary when recording digital information. Gain positions are not needed since the digital inputs are always the same in amplitude. Assigning a unique base line to each channel is also unnecessary since all digital inputs have the same zero reference level. Having these adjustments only adds to the size, complexity, and cost of the multiplexer. There are also drift problems encountered when using gain and position adjustments. Because of the complexity of this type of multiplexer, initial adjustments require a great deal of time. Circuit complexity also adds to the unreliability of the multiplexer.

SUMMARY OF THE INVENTION

Accordingly, there is provided a system for multiplexing a large number of digital signals onto a few analog channels. By making the digital signals appear in an analog format, full advantage of the dynamic range of the analog recorder may be taken. A level code encoder assigns a unique reference level for each digital signal for a logical "one," with a zero baseline applied for each digital "zero," and applies the zero or reference level to a multiplexer. A sequencer, controlled by a clock, sequences the various gates of the multiplexer to provide the signals to be recorded on the various analog channels.

OBJECTS OF THE INVENTION

It is therefore an object of the present invention to record a large number of digital signals onto a few analog channels.

Another object of the present invention is to translate digital information into an analog format for recording on an analog recorder.

Still another object of the present invention is to increase the number of digital signals that may be recorded on a channel of an analog recorder.

Yet another object of the present invention is to provide a novel multiplexing technique.

These and other objects and advantages of the present invention will become apparent from the following description of the illustrative embodiment of the invention taken in conjunction with the accompanying drawings in which:

FIG. 1 illustrates in block diagram form the level-code encoder according to the invention; and FIG. 2 illustrates in schematic form the level-code encoder according to the invention.

DESCRIPTION OF THE PREFERRED EMBODIMENT

The multiplexing scheme developed has been termed level-code encoding and is ideally suited for use with analog recorders. The digital inputs to the multiplexer are each converted to a unique voltage reference level. These levels are then multiplexed onto the analog channels. Since each analog channel is composed of numerable reference levels, the number of digital channels compacted onto one analog channel is limited only by the dynamic resoltuion of the recorder and the digital data rate. When very slow data rates are being recorded, a large number of digital inputs may be monitored.

The analog recorder adapted for this scheme has eight analog channels. Four digital inputs were used in each of six channels, leaving two analog channels available for normal use. Each of the four digital inputs were assigned to a unique voltage reference level. The same reference levels were repeated for all six channels.

The digital inputs to the multiplexer are present in binary form. A one was considered a positive voltage level, while a zero was considered a ground potential. The corresponding output of the level-code encoder was a defined voltage level for a one and ground for a logic zero. It is apparent that all digital inputs will share a common output for the zero state, while each positive input will have a unique output potential. Simply by allowing more reference levels, the number of digital inputs may be easily expanded.

Figure 1:
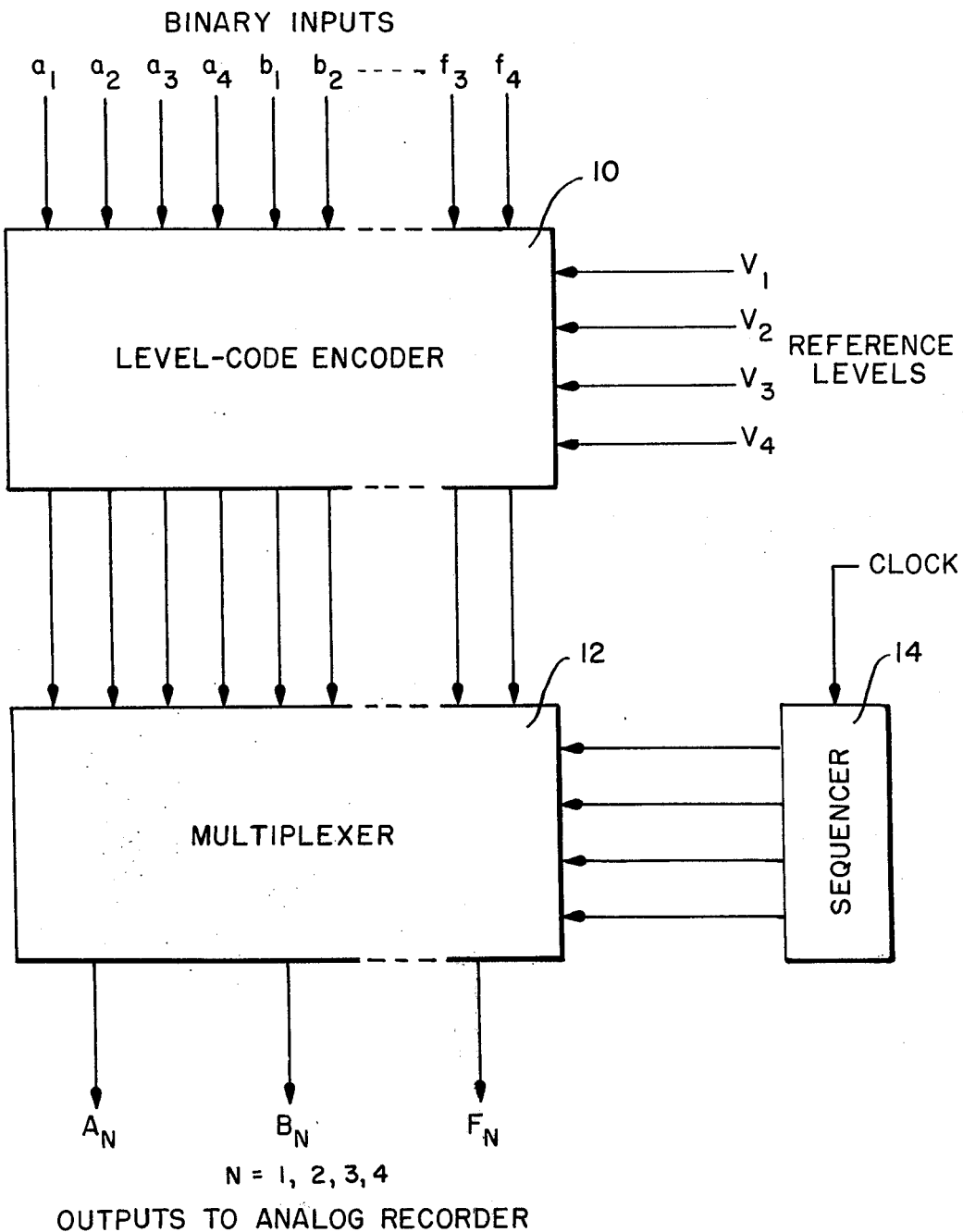

Referring now to the drawings wherein like reference numerals designate corresponding parts throughout the several views, FIG. 1 shows in block form the level-code encoded multiplexer. The incoming digital signals $a_1, a_2, a_3, a_4, b_1, b_2, \ldots f_3, f_4$ enter at the encoder 10 where a unique reference level $V_1, V_2, V_3$, or $V_4$, is given to each logic input. Since the outputs of the multiplexer 12 are connected to independent analog channels, the reference levels may be repeated for each analog channel assignment.

Once the digital inputs are assigned a reference level, these levels are sampled by sequencer 14. The output of the multiplexer 12 is a composite of the reference levels. The reference levels are present only when the digital input is present. If no inputs are present, the output of the multiplexer 12 is ground. Thus, all digital inputs share a common logic zero reference.

Figure 2:
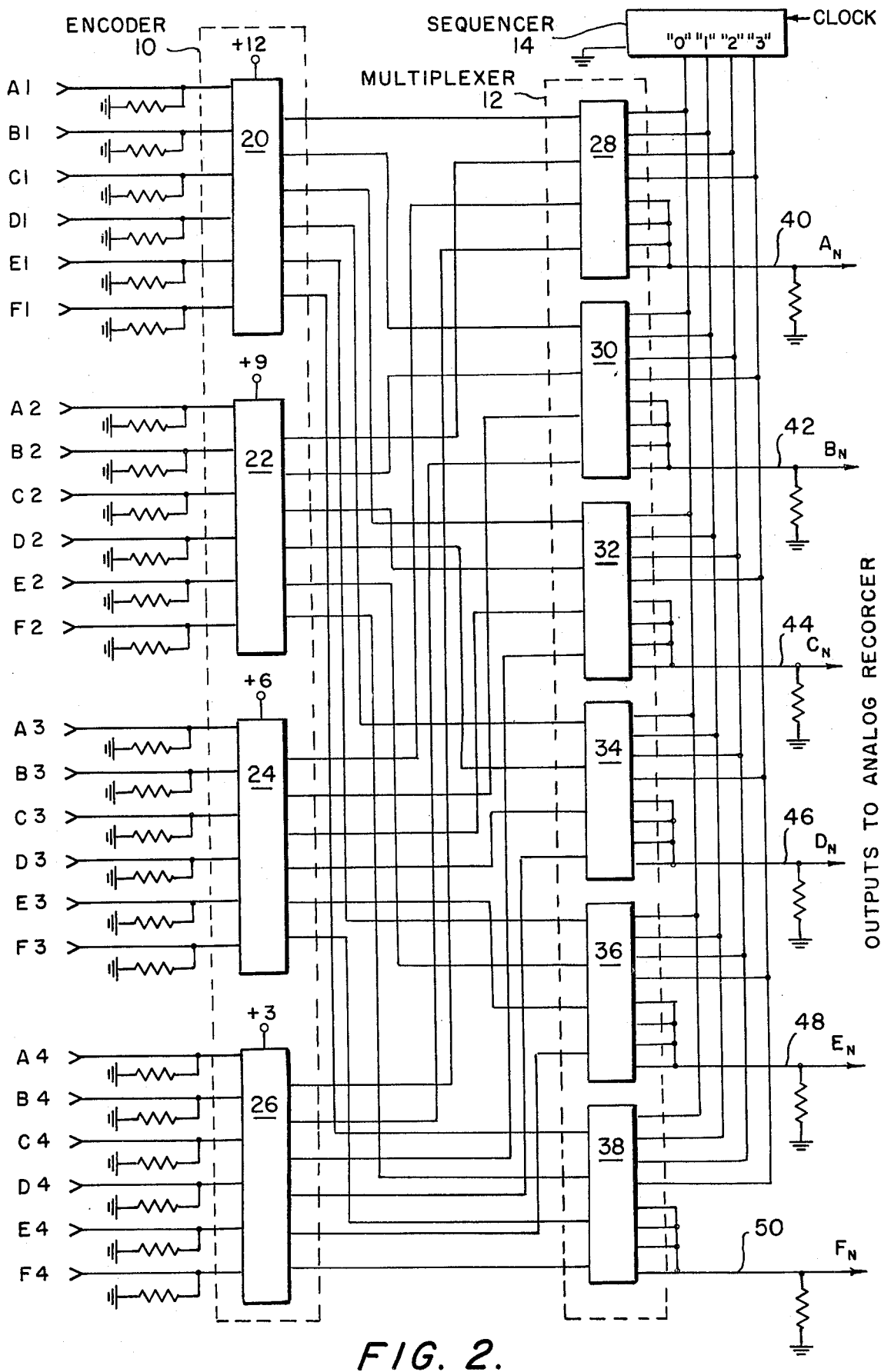

Referring now to FIG. 2, the level-code encoder is the key to this type of multiplexing technique. This encoder 10 must be capable of supplying a separate output voltage given a standard input level. The CD 4010A COS/MOS circuits 20, 22, 24, 26 makes a convenient level shifter. COS/MOS devices having the nomenclature CD are manufactured by RCA Corporation, amongst others, with a complete description thereof found in RCA COS/MOS Digital Circuit Manual, 1974. This hex buffer has the flexibility of level shifting logic levels to values less than or equal to the supply voltage. A level encoder is developed by connecting the $V_{cc}$ on these intergrated circuits 20, 22, 24, 26 to different voltage levels. For example, level shifter 24 is coupled to a+6 voltage level, and if logic one is provided by digital signal C3, level shifter 24 would supply a respective 6 volt signal to analog gate 32 of multiplexer 12.

The multiplexer 12 comprises several CD 4016A analog gates 28, 30, 32, 34, 36, and 38. Appropriate inputs are tied to the output lines by properly switching on each gate of the CD 4016A. If the logic level-code is present on the inputs to the analog gate at the appropriate sample time, the level-code (six volts on bus 44 for this example) will be transferred to the output bus.

Encoding of the multiplexer 12 is achieved by sequentially turning on the analog gates. A CD 4017A is used as a four line ring counter. The sample time of the ring counter is equal to the clock period clocking the sequencer 14. Two NOR gates (not shown) used as a stable oscillator having a period adjusted from 30 ms to 300 ms may be used to clock the sequencer.

The number of digital channels which may be multiplexed onto each analog channel is represented by the minimum duration of any digital signal. The required duration for any one digital input is:

Minimum Duration = $(N-1)(1/F_s) + \tau$

Where
$F_s$ is the sample rate of the multiplexer
N is the number of logic channels per analog channel
$\tau$ is the response time of the recorder Rearranging this expression will yield the maximum number of channels possible to be multiplexed onto each analog channel $N_{max} = F_s$ (Minimum Duration $- \tau$) $+ 1$ Where
$N_{max}$ is the maximum number of channels for each analog channel and
$N_{max}$ is an integer.

When using this equation, always round $N_{max}$ down to the next lowest integer. As an example, consider the application of recording a digital sequencer with minimum signal duration time of 110 ms. The sample frequency will be 50 Hz and the response time, $\tau$, is 5 ms. Using the $N_{max}$ equation:

$N_{max} = 50$ Hz $(0.110 - 0.005)$ sec $+ 1 = (0.105) 50$
$+ 1 = 6.25$
$N_{max}$ is 6 rounded down.

Thus, in this example, six digital signals may be recorded on each analog channel. If eight analog channels are available, 48 digital signals may be recorded in all.

The response time, $\tau$, of the recorder must be taken into consideration. For the strip chart application, $\tau$ was found to be 5 milliseconds. The rate, of course, varies with the recording medium.

The level-code encoded multiplexer is limited principally by the recording device. A strip chart recorder has a minimum response time and this affects the maximum data rate which may be recorded. The strip chart recorder has its most useful application when the logic rates are slow. If an oscilloscope is used as the storage device, the sample rate in the level-code may be increased by orders of magnitude. This is possible because of the increased writing speed of the storage device.

There has therefore been described a level-code encoded multiplexer that is simple in construction and reliability. Practically all of the circuit implementation is composed of digital integrated circuits making the repeatability of the design simplified. There are not any adjustments to contend since all reference levels are statically defined.

Level-code encoded multiplexing is a method of multiplexing digital information by using an analog format. COS/MOS circuits using very little power may be employed, and may be used to modify any type of recorder. Many digital inputs may be multiplexed by using this technique, yet the identity of each input is retained. The multiplexer may be used when an interface is needed between an analog recorder and digital signals. Since many signals can be put on each analog channel, the recording medium may record at increased signal densities.

A large number of digital signals may be multiplexed onto a few analog channels by translating them into an analog format. Any analog recorder may be effectively adapted to many digital inputs.

Contrary to the normal multiplexer technique, this multiplexing scheme is free of gain and positioning controls. All channels share the same voltage reference levels. Also, since each voltage reference level is scaled down from the supply reference level, all reference levels keep the same relative scaling factor, independent of the supply level. Thus, it is easy to convert this multiplexing scheme to other logic familied, simply by changing the main supply voltage level to correspond to the supply level of the digital equipment under test.

The new feature of this multiplexing technique is the digital-to-analog conversion of the input signals. Each digital input is converted to a new logic level before it is multiplexed. The analog recorder can then differentiate between different logic signals on the same analog channel.

It will now be apparent that a novel recording system has been disclosed in such full, clear, concise, and exact terms so as to enable any person skilled in the art to which such systems pertain to construct and use the same. It will also be apparent that various changes and modifications may be made in form and detail by those skilled in the art without departing from the spirit and scope of the invention. If a lower output impedance is needed, a voltage follower may be inserted between the multiplexer's output and the recorder's input. A simple resistive voltage divider determines what level codes will be used. Here again, a voltage follower may be used to lower the impedance of the reference ladder. Precision zener diodes could also be connected in series to provide very accurate reference levels.

An interesting modification of the fixed reference level idea would be to incorporate variable voltage levels for each reference. It would then be possible to move the position assignments of the digital inputs to different positions on the recording media. Of course, circuit complexity would increase.

It is fairly easy to expand the level-code encoder to accommodate more digital channels. Level encoders (CD 4010A) may be added with additional multiplexers (CD 4016A) to give any density necessary. The parameters of the analog recoder and the digital data rate must be taken into account to successfully expand the level-code encoded multiplexer.

What is claimed as new and desired to be secured by Letters Patent of the United States is:

1. A system for multiplexing a plurality of digital signals from separate sources onto a few analog channels comprising:

means for encoding digital signals from different sources so as to associate signals from each source with a respectively unique analog reference level representing digital "one" and to associate signals from all sources with a common zero ground level for a digital "zero;" and sequencing means for multiplexing said signals to their respective channels.

2. A multiplexing system as recited in claim 1 wherein said encoding means comprises a plurality of hex buffers and said sequencing means comprises a multiplexer including a plurality of analog gates controlled by clocking means.

* * * * *